United States Patent [19]

Kawamura et al.

[11] Patent Number: 5,420,724
[45] Date of Patent: May 30, 1995

[54] CONTROLLING SYSTEM AND METHOD FOR AUDIO OR VIDEO UNITS

[75] Inventors: Harumi Kawamura, Tokyo; Hisato Shima, Chiba; Naoki Nagano, Tokyo, all of Japan

[73] Assignee: Sony Corporation, Tokyo, Japan

[21] Appl. No.: 195,848

[22] Filed: Feb. 14, 1994

Related U.S. Application Data

[63] Continuation of Ser. No. 906,229, Jun. 26, 1992, abandoned.

[30] Foreign Application Priority Data

Jul. 6, 1991 [JP] Japan ................................. 3-192640

[51] Int. Cl.6 .............................................. G11B 27/11
[52] U.S. Cl. ....................................... 360/13; 395/550
[58] Field of Search ....................... 360/14.2, 14.3, 15, 360/13; 395/556

[56] References Cited

U.S. PATENT DOCUMENTS

| | | | |
|---|---|---|---|
| 4,358,797 | 11/1982 | Nishijima et al. | 360/14.2 |
| 4,578,718 | 3/1986 | Parker et al. | 360/10.3 |
| 4,628,370 | 12/1986 | Fukuoka | 360/15 |
| 4,858,027 | 8/1989 | Sashou | 360/14.3 X |
| 5,182,677 | 1/1993 | Kizu et al. | 360/14.2 |
| 5,241,667 | 8/1993 | Matsumoto | 395/550 |

FOREIGN PATENT DOCUMENTS 2187324 9/1987 United Kingdom .

OTHER PUBLICATIONS

"Videotape Program Production at CBS Studio Center" William G. Connolly, SMPTE Journal vol. 87, No. 11, Nov. 1978.
"The Use of Microcomputers and Microprocessors in Modern VTR Control" Heinz-Dieter Geise, Journal of Study of Motion Picture & Tel. Eng. vol. 88, No. 12, Dec. 1979.

Primary Examiner—Aristotelis Psitos
Assistant Examiner—James T. Wilson
Attorney, Agent, or Firm—W. Patrick Bengtsson; Limbach & Limbach

[57] ABSTRACT

A computer is connected to VTR units and a CRT monitor through lines. Each of the computer and the units to be controlled thereby is provided with a clock means for sharing the same time. The computer sends to the VTR unit a command for releasing record pause state and starting the record operation at time T1. After the VTR unit started the record operation, when the counter value became x, the VTR unit sends time Tx to the computer. The computer computes formula $$D = Tx - T1 - x$$

so as to obtain delay time D. In determining the present tape position of the VTR, the computer obtains data of counter value Pc and time Tc from the VTR, and assigns the present tape position Pn of the VTR using the formula $$Pn = Pc + (Tn - Tc),$$

where Tn is the time at which the controller receives the signal from the VTR.

7 Claims, 5 Drawing Sheets

CONTROLLING SYSTEM AND METHOD FOR AUDIO OR VIDEO UNITS

This is a continuation of application Ser. No. 07/906,299, filed Jun. 26, 1992, now abandoned.

BACKGROUND OF THE INVENTION

1. Field of the Invention

The present invention relates to a controlling system and method for controlling an audio or video unit by using a computer.

2. Description of the Prior Art

When an audio or video unit for example a VTR unit was controlled by using a computer, it was difficult to electrically connect the control terminals of the VTR unit and those of the computer. As an intrinsic matter of VTR units, when two or more VTR units were used for editing a program, timings of these VTR units should be precisely matched. Thus, in this situation, a dedicated controller was sometimes used.

As an example, in an editing system including a reproducing VTR unit and a recording VTR unit, a magnetic tape recorded both video information and a time code for representing the position thereof. The editing controller received a time code reproduced from each VTR unit and generated a control signal for controlling an operation mode of each VTR unit. In this situation, the editing controller controlled each VTR unit so that a particular operation mode was executed at a particular timing. As a result, after both the VTR units were in a synchronous operation state, the recording VTR unit recorded a reproduced output of the reproducing VTR unit.

The applicant of the present invention has proposed a system having a clocking means for sharing the same time among a controller and audio or video units controlled thereby so that VTR units can be controlled by a personal computer. In this system, a communication protocol referred to as VISCA protocol was used among the controller (specifically, the personal computer) and the audio or video units. An outline of this communication protocol was in that a command associated with a time of the common clock was sent through two-way communication lines. A receiving unit stored the received command and executed the command at the time specified by the command.

As described above, although the system had a reference time, it was impossible to solve an intrinsic delay of a VTR unit which took place when the unit executed a command. In other words, even if a recording VTR unit released the record pause state at a designated time and started a record operation, this VTR unit had a slight delay in the record operation. As a result, the beginning of the image to be recorded was lost.

The conventional editing controller was provided with a timing adjusting means for solving an intrinsic delay of the unit. In other words, the editing controller sent to the recording VTR unit the record pause releasing command at an earlier time by the measured delay time. As a method for measuring this delay time, a tape which displays a second hand of a clock on a screen was provided. Thereafter, the tape was reproduced and edited so that the position of 0 second was referred to as a cut-in point. Next, the edited tape was reproduced and a deviation of the cut-in point was determined on the screen. This delay time was set as a timing adjustment time of the edit controller. Thereafter, the same edit operation was repeated and the timing adjustment time was set so that no deviation took place.

As described above, when a delay time was measured, a tape which displays a time on the screen was required. Thus, this system required the user to perform a complicated edit operation. In addition, when the timing was finely adjusted, the adjustment became troublesome. Thus, only coarse adjustment such as intervals of 2 sec was available.

In the above description, only an intrinsic delay of the VTR unit was described. However, there is another delay which takes place over a communication line and a VTR unit after the controller sends a command to the VTR unit until the controller receives the reply such as the position of a recording medium (a tape or the like). Thus, this delay results in deteriorating the editing accuracy.

OBJECTS AND SUMMARY OF THE INVENTION

Therefore, an object of the present invention is to provide a controlling system and method for audio or video units for solving an intrinsic delay time of the unit and a delay time which takes place over a transmission line between the controller and the units.

According to an aspect of the present invention, there is provided a controlling system, comprising a controller, at least one audio or video unit, a clocking device, the clocking device being provided in the controller and the audio or video unit and being arranged to share the same time among the controller and the audio or video unit, and a sending device for sending position information of a recording medium to record and reproduce audio or video information and time information of the clocking device with respect to the position information from the audio or video unit to the controller, wherein the controller is arranged to compute the position information and the time information and generate control signals for the audio or video unit.

The above, and other, objects, features and advantages of the present invention will become readily apparent from the following detailed description thereof which is to be read in connection with the accompanying drawings.

DETAILED DESCRIPTION OF THE PREFERRED EMBODIMENTS

Figure 1:
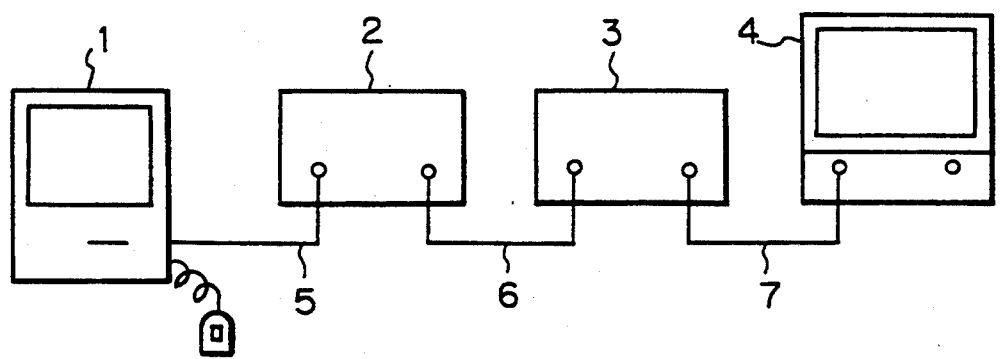
FIG. 1 is a block diagram showing a construction of an example of a control system in accordance with the present invention.

Now, embodiments of the present invention will be described. First, an example of a VTR editing system in accordance with the present invention will be described with reference to FIG. 1. In the figure, reference numeral 1 is a controller, practically a personal computer. Reference numerals 2 and 3 are VTR units. Reference numeral 4 is a CRT monitor. In this embodiment, the VTR unit 2 is a reproducing unit, whereas the VTR unit 3 is a recording unit. A communication line 5 connects the computer 1 and the VTR unit 2. The VTR unit 3 and VTR unit 2 are connected with a communication line 6. The VTR unit 3 and the CRT monitor 4 are connected with a communication line 7. Each of these communication lines 5, 6, and 7 is of two way type and is composed of a plurality of signal lines. Command, acknowledge, and reply data are transmitted through the communication lines 5, 6, and 7 in accordance with a communication protocol referred to as VISCA. With the connections as shown in FIG. 1, a plurality of units can be connected to one port of the computer 1.

Figure 2A:
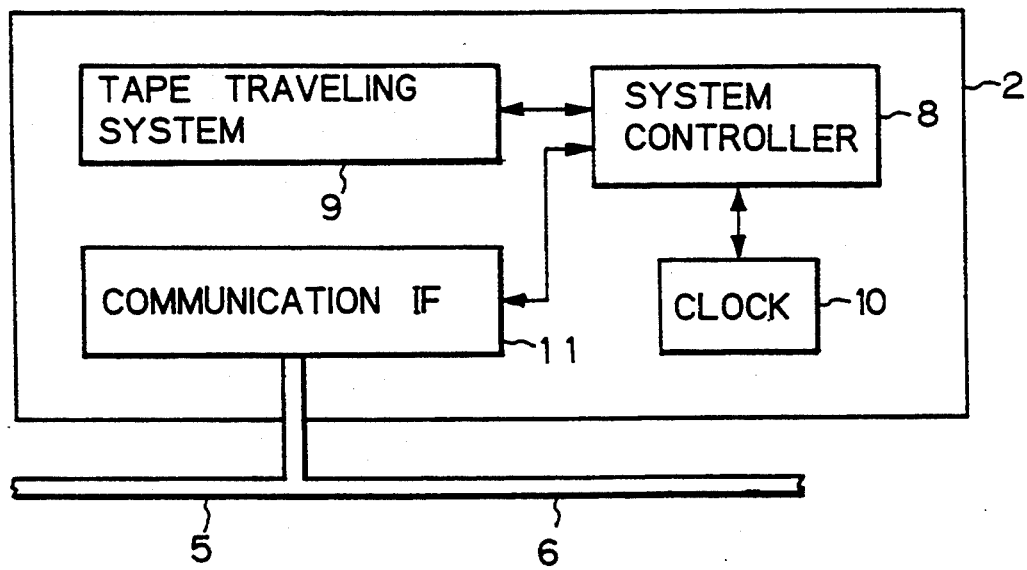
FIG. 2A is a block diagram showing a construction of an example of a unit being controlled or a controlling box.

The VTR units 2 and 3 and the monitor 4 are controlled in accordance with the VISCA. For example, as shown in FIG. 2A, the VTR unit 2 is provided with a clock unit 10 and a communication interface unit 11 along with a system controller 8 for controlling a tape traveling system 9, and so forth. The communication interface unit 11 is connected to the communication lines 5 and 6. The clock unit 10 generates time information consisting of digits of hours (=H), minutes (=M), seconds (=S), and 1/300 seconds (=T). The clock unit 10 can be accomplished by either hardware comprising a crystal oscillator and a counter for dividing the output thereof or by software. The VTR unit 3 and the monitor 4 have the same control construction as the VTR unit 2 shown in FIG. 2A.

Each digit of the clock unit provided in each unit is reset by a reset signal received from the computer 1. Thus, the computer 1 and each unit shares the same time. The reset signal from the computer 1 is sent to all the units simultaneously. A command which designates an operation mode of each unit is transmitted from the computer 1 to each unit through the communication interface unit 11 of the VTR unit 2, a communication interface unit of the VTR unit 3, and a communication interface unit of the monitor 4. When each unit receives a command from the computer 1, the unit sends the acknowledge and reply data with respect to position information of a magnetic tape, time information, and so forth back to the computer 1 in response to ask from computer 1. In accordance with VISCA, each command is associated with time information given by the common clock. In other words, each command is associated with time information with respect to the execution thereof. Each message is associated with information of the status detection time.

In FIG. 1, each of the VTR units 2 and 3 to be controlled and the monitor 4 has a control construction in accordance with VISCA as shown in FIG. 2A. However, there is a possibility that conventional audio or video units do not have such a control construction. When such a conventional unit is controlled in accordance with VISCA, a system construction as shown in FIG. 3 is used.

Figure 3:
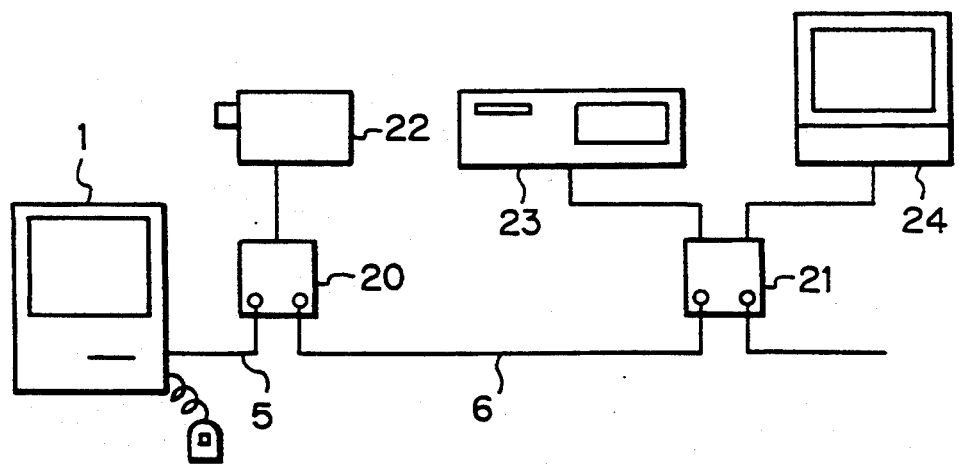
FIG. 3 is a block diagram showing a construction of another example of a control system in accordance with the present invention.

In FIG. 3, the computer 1 is connected to a control box 20 through the communication line 5. The control box 20 is connected to a control box 21 through the communication line 6. The control box 20 is connected to a VTR 22 for example a VTR associated with a video camera through a communication line for transmitting conventional control signals. The control box 21 is connected to a fixed type VTR unit 23 and a CRT monitor 24 through respective communication lines. Each of the control boxes 20 and 21 is provided with two types of control signal output terminals. For example, a terminal LANC of the control box 21 is connected to the VTR unit 23. A control terminal S is connected to the monitor 24. In FIG. 3, a reproduced output of the VTR unit 22 is recorded by the VTR unit 23.

Figure 2B:
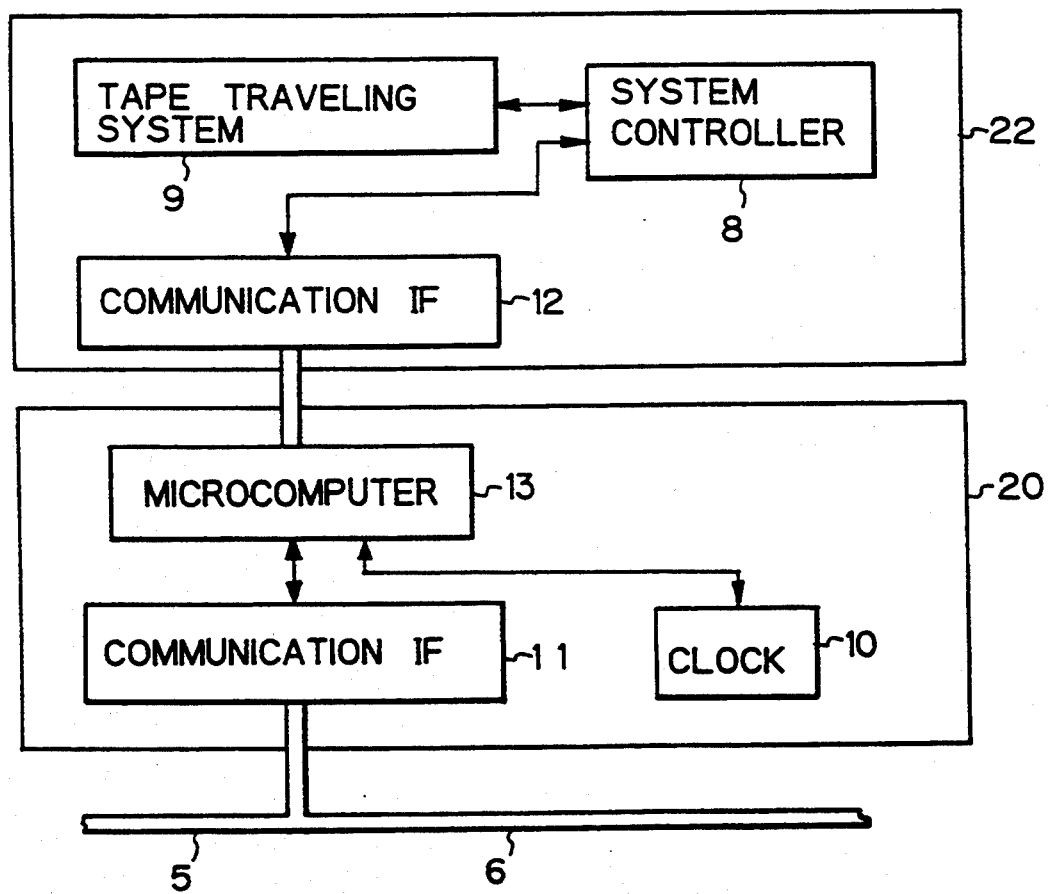
FIG. 2B is a block diagram showing a construction of another example of a unit being controlled or a controlling box.

FIG. 2B is a block diagram showing an example of a control construction of the control box 20 and the video camera 22. The control box 20 is provided with the clock unit 10 for giving a common time to the system, the communication interface unit 11, and a microcomputer 13. The communication interface 11 connects the control box 20 to the computer 1 and the other control box 21 through the communication lines 5 and 6. The microcomputer 13 communicates with the communication interface unit 12 of the video camera 22. The video camera 22 is provided with the system controller 8 for controlling the tape traveling system 9. The communication interface unit 12 operates in accordance with a protocol for example LANC for communication with conventional control signals. The communication line between the microcomputer 13 and the communication interface unit 12 is of bi-directional type. The microcomputer 13 converts signals communicated between the computer 1 and the control box in accordance with VISCA into signals in accordance with LANC.

FIGS. 1, 2, and 3 only showed the control constructions. Between the VTR unit 2 and the VTR unit 3 and between the VTR unit 3 and the monitor 4, signal lines for transmitting video signals and audio signals are provided.

In the controlling system shown in FIG. 1, when the edit process is performed, the computer 1 controls the reproducing VTR unit 2. At that time, an edit point (cut-in point) is designated in the reproducing VTR unit 2. The recording VTR unit 3 is set to a record pause mode. The tape of the VTR unit 2 is rewound to a position several seconds earlier than the edit point and the reproduction operation is started. When the tape of the VTR unit 2 comes to the designated edit point, the record pause state of the VTR unit 3 is released. The reproduced signal of the VTR unit 2 is recorded by the VTR unit 3.

Figure 4:
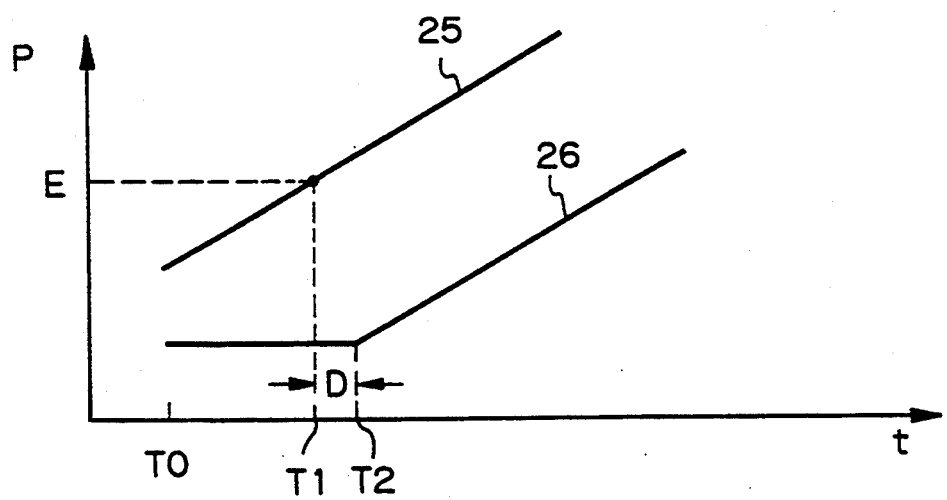
FIG. 4 is a chart describing a delay time of a recording VTR unit which starts record operation.

As shown in FIG. 4, at time T0, the computer 1 sends command "start record operation at time T1" to the VTR unit 3. FIG. 4 is a chart showing the relation between system reference time (X axis) and tape position P (Y axis), which is tape counter value P, of the reproducing VTR unit 2. The counter value P normally represents a counting value with digits of hours, minutes, and seconds. In FIG. 4, line 25 represents a variation of the tape position of the VTR unit 2 and line 26 represents a variation of the tape position of the VTR unit 3. At time T1, tape position E of the VTR unit 2 is the edit point. At the edit point, the record pause state of the VTR unit 3 is released. However, the VTR unit 3 actually starts the record operation at time T2 which is later than time T1 by delay time D. As a result, an image just after the edit point E is not recorded. This situation remains the same for the systems which use the control box 20 or 21. Rather, due to presence of the control box 20 or 21, delay time D becomes larger than the delay in the system shown in FIG. 1. Thus, it is necessary to measure this delay time D in advance and shorten time T1 at which the record pause is released. In other words, the computer 1 sends command "start record operation at time (T1−D)" to the VTR unit 3.

Figure 5:
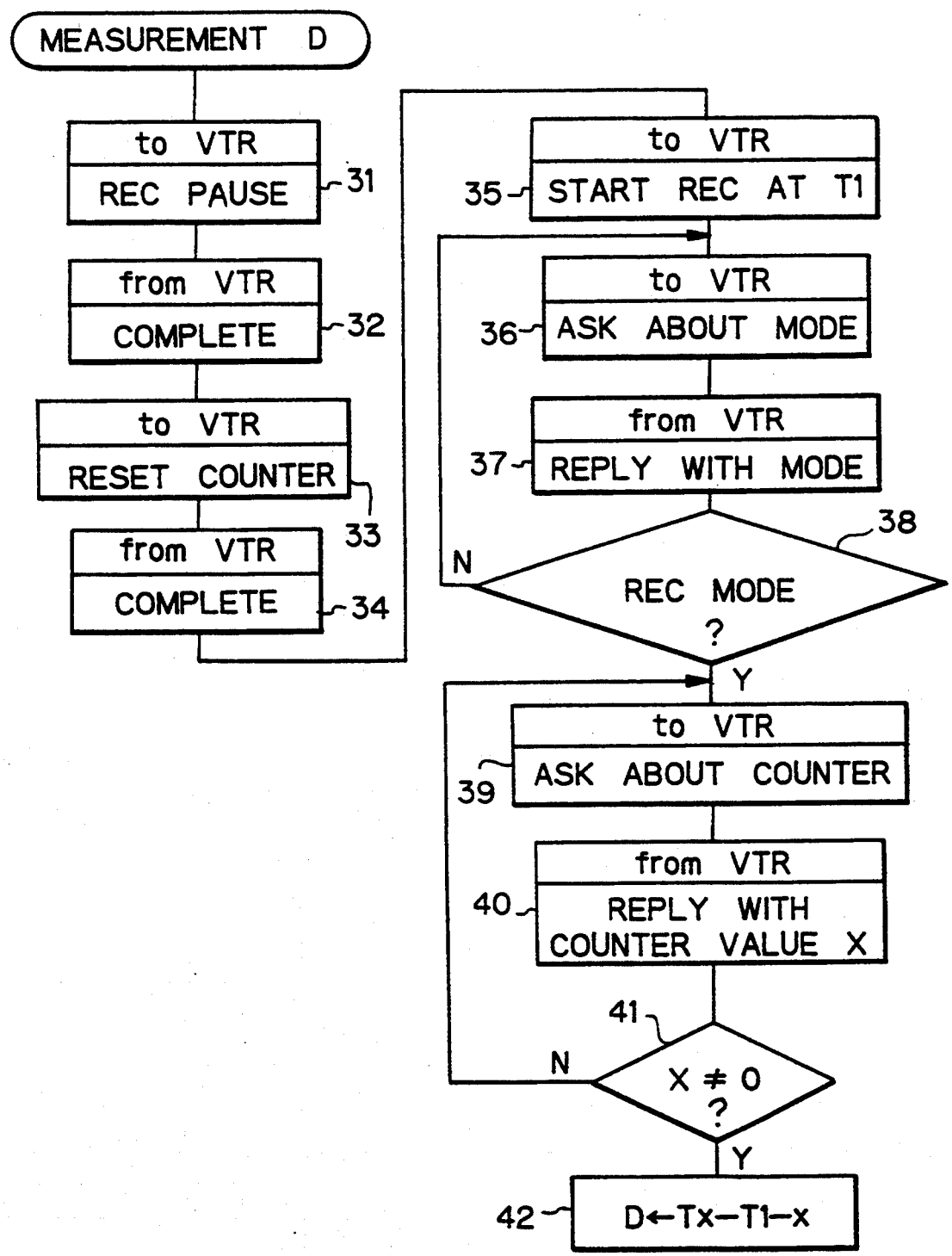
FIG. 5 is a flow chart describing an embodiment of the present invention.

Then, with reference to a flow chart shown in FIG. 5, the measurement process performed by the computer 1 for delay time D of the VTR unit 3 will be described. First, the computer 1 sends command "record pause operation" to the VTR unit 3 (in step 31). The VTR unit 3 sends an acknowledge which represents that the VTR unit 3 has entered the record pause state to the computer 1 (in step 32). In this way, when the computer 1 sends a command which designates an operation mode to a remote unit, the remote unit sends an acknowledgement representing that the unit has entered the designated operation mode. Thereafter, the computer 1 sends a subsequent command to the remote unit. Alternatively, in step 32, the computer 1 can ask the VTR unit about its mode.

Thereafter, the computer 1 resets the tape counter (in step 33) and then receives from the VTR unit 3 an acknowledgement representing that the tape counter has been reset. In step 35, the computer 1 sends command "start record operation at time T1" at a time earlier than time T1. Thereafter, the computer 1 asks the VTR unit 3 about its operation mode (in step 36). The VTR unit 3 sends a reply which represents the mode at that time to the computer 1. The computer 1 receives this reply (in step 37). The computer 1 determines whether the VTR unit 3 has entered the record mode by using this reply (in step 38). When the computer has determined that the VTR unit 3 has entered the record mode, the flow advances to step 39 that follows. In steps 36, 37, and 38, the computer 1 determines whether the VTR unit 3 has entered the record mode. Instead of these steps, the computer 1 can wait for a particular time period until the VTR unit 3 enters the record mode.

After the computer 1 has determined that the VTR unit 3 has entered the record mode, the computer 1 sends a command for asking about the tape position (counter value) to the VTR unit 3. The VTR unit 3 sends counter value x and system time Tx at that time to the computer 1. The computer 1 receives these data (in step 40). The computer 1 determines whether or not the received counter value x is 0 in step 41. The computer 1 computes delay time D by using counter value x and time Tx (in step 42).

In other words, by the computation of D=Tx−T1−x, delay time D is obtained. This computation is executed by software of the computer 1. As a result, delay time D is stored in memory of the computer 1. Delay time D can be replaced with the old data which has been stored in the memory or each of the delay time for a plurality of VTR units can be stored. Delay time D stored in the memory is used in the edit process that follows the measurement process. As described above, the designated execution time associated with the record pause release command which is sent from the computer 1 to the VTR unit 3 becomes T1−D.

Figure 6:
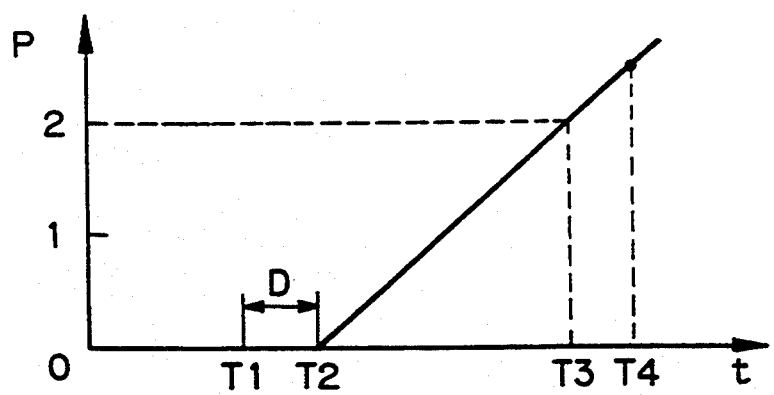
FIG. 6 is a chart describing a delay time measurement process of an embodiment in accordance with the present invention.

FIG. 6 is a chart practically describing the measurement process of the above mentioned delay time D. When the VTR unit 3 starts the record operation at time T1 in accordance with the record start command received in the step 35 of FIG. 5, the counter value varies from time T2 later than time T1 by delay time D. The computer 1 asks about the counter value at time T4 which is later than time T3 (in step 39). The VTR unit 3 detects time T3 at which the counter value becomes for example 2 seconds. The VTR unit 3 sends the counter value (2 seconds) and time T3 back to the computer 1 (in step 40). FIG. 6 represents that the amount of tape which traveled from time T1 to time T3 is 2 seconds. Since (T3−T2) becomes 2 seconds in the case where the tape speed is a normal speed (x1), the delay time can be determined by using formula $$[(D=T3-T1-2) \text{ (seconds)}].$$

Before starting the edit operation, the intrinsic delay time of the VTR unit can be easily measured by software so that the computer automatically controls the above mentioned measurement. Thus, the delay time which will take place in the later edit operation can be compensated. In addition, according to this embodiment, since the minimum unit of the system time is 1/300 seconds, the delay time can be precisely measured.

In the above measurement process of delay time, the delay time from the record pause state to the record start state was mentioned. However, the present invention can be also applied to a startup time from the reproduce pause state to the reproduce start state.

Figure 7:
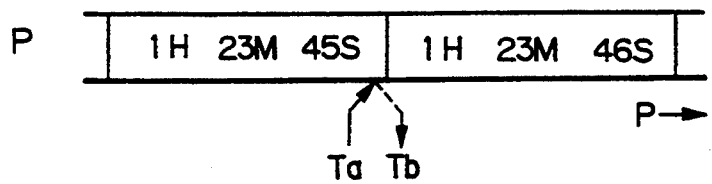
FIG. 7 is a schematic diagram describing another embodiment in accordance with the present invention.

In the above mentioned embodiment, the computer 1 sends the tape position asking command to the VTR unit 3. The VTR unit 3 sends counter value x, which is the tape position, and time Tx, at which the VTR unit 3 has detected counter value x, to the computer 1. This time Tx represents the time at which counter value P was changed to counter value x. Conventionally, when the tape position was asked, only the counter value was replied. However, in this manner, as shown in FIG. 7, when the counter value P changes for example from 1 H, 23 M, 45 S to 1 H, 23 M, 46 S, just before the counter value is changed, the computer as the controller sends the tape position asking command to the VTR.

The computer sends the tape position asking command to the VTR at time Ta. Thereafter, the VTR sends the counter value to the computer. However, due to a delay caused by the communication lines and units, the computer receives the counter value from the VTR at time Tb. Thus, the computer cannot determine what time it received the counter value. In the example shown in FIG. 7, at time Tb at which the computer received the counter value from the VTR, the counter value has been advanced to next value. Thus, when the computer controls the VTR in accordance with the tape position, the control accuracy is deteriorated.

In the control systems shown in FIGS. 1 and 2, there is provided a common system clock. Next, another embodiment for accurately detecting the tape position by using a time given by the clock will be described.

Figure 8:
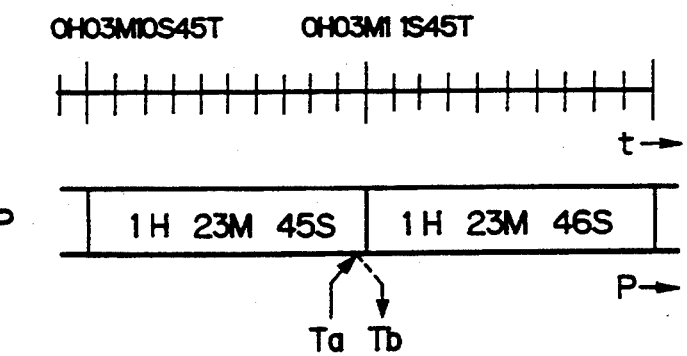
FIG. 8 is a schematic diagram describing further another embodiment in accordance with the present invention.

As shown in FIG. 8, in the another embodiment, the computer sends the tape position asking command to the VTR at time Ta. The data sent from the VTR to the computer at time Tb is a counter value (1 H, 23 M, 45 S)

and a time (0 H, 03 M, 10 S, 045 T (where T=1/300 seconds)) at which the counter counted this counter value. In other words, the time of the data sent to the computer is not the time at which the VTR received or sent the command. The computer computes the present tape position by using the reply data in the following manner.

Assume that the computer received the replay data at 0 H, 03 M, 11 S, 057 T. Thus, there is the following time delay after the counter value of 1 H, 23 M, 45 S until the computer received the data.

$$0\ H,\ 03\ M,\ 11\ S,\ 57\ T - 0\ H,\ 03\ M,\ 10\ S,\ 45\ T = 0\ H,\ 0\ M,\ 01\ S,\ 12\ T$$

When the VTR is in the reproduction (record) mode, this elapsed time (01 S, 012 T) causes the VTR tape to travel the length equivalent to 1 and 12/300 seconds. In the NTSC system, since one second is equal to 30 frames, 2/300 seconds are equal to approximately 1 F (where F is frame). Thus, the tape position at time 0 H, 03 M, 11 S, 57 T is 1 H, 23 M, 46 S, 01 F.

Figure 9:
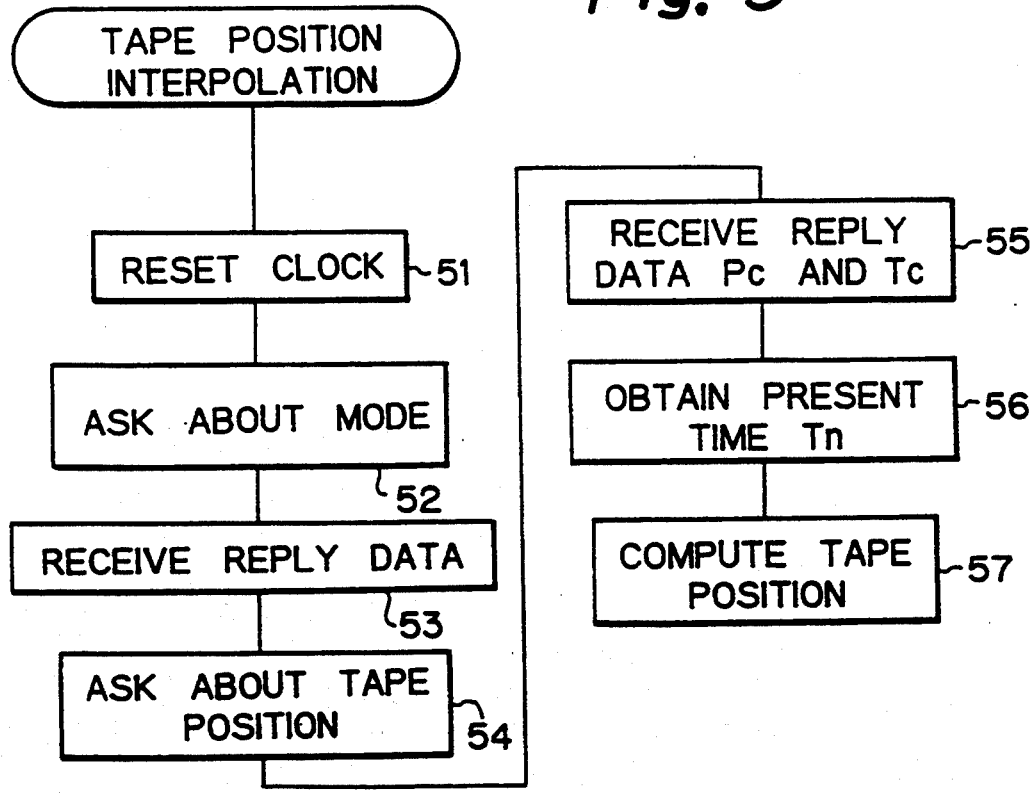
FIG. 9 is a flow chart in accordance with another embodiment of the present invention.

Next, with reference to FIG. 9, the flow of control of the control system in accordance with another embodiment of the present invention will be described. By the reset signal received from the computer, the unit connected thereto or the clock device of the control box is reset. Thus, the reference time of the control system is established (in step 51). Then, the computer asks the VTR about its mode (in step 52). The computer receives the replay data from the VTR and knows that the VTR has entered the reproduction mode (in step 53).

The computer sends the tape position asking command to the VTR (in step 54). The VTR generates reply data of counter value Pc and time Tc at which the counter just counted counter value Pc and sends these data to the computer (in step 55). The computer obtains the present time Tn (in step 56). In the above mentioned practical example, Pc=1 H, 23 M, 45 S; Tc=0 H, 03 M, 10 S, 045 T; and Tn=0 H, 03 M, 11 S, 057 T. The computer computes the present tape position (counter value) Pn of the VTR. In other words, the computer computes the formula $$Pn = Pc + (Tn - Tc).$$

In the NTSC system, the digit of T is multiplied by 1/10 and converted into frames. On the other hand, in the CCIR system, the digit of T is multiplied by 1/12.

As described above, in this embodiment, the present tape position can be accurately obtained. In addition, the tape position at any time can be obtained. Moreover, although the VTR is provided with only the tape counter in the unit of seconds, the information of the tape position in the unit of frames can be obtained. Thus, according to this embodiment, the edit accuracy can be improved.

It should be appreciated that the present invention can be applied to control systems for video disk reproducing units, disk recording units, disk reproducing units, digital audio tape recorders and so forth as well as VTR units.

According to the present invention, in a controlling system having a computer and audio or video units to be controlled thereby, a delay time which takes place in the units and over the communication lines can be solved. Thus, the unit can be precisely controlled.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A controlling system, comprising:
   a controller;
   at least one audio or video unit;
   first clocking means, provided in said controller;
   second clocking means provided in said audio or video unit, said first clocking means and said second clocking means capable of being synchronized with each other; and
   sending means for sending position information of a recording medium to record and reproduce audio or video information and time information of said second clocking means with respect to said position information from said audio or video unit to said controller;
   wherein said controller is arranged to compute said position information and said time information and generate control signals for said audio or video unit.

2. A controlling method for a controlling system having a controller, at least one audio or video unit, first clocking means provided in said controller, and second clocking means provided in said audio or video unit, said first clocking means and said second clocking means capable of being synchronized with each other, said controlling method comprising the steps of:
   asking said audio or video unit about a mode thereof;
   receiving position information of a recording medium to record and reproduce audio or video information and time information of said second clocking means with respect to said position information to said controller; and
   computing said position information and said time information so as to generate a control signal for said audio or video unit.

3. A controlling method for an editing system having a controller, a plurality of audio or video units, first clocking means provided in said controller, and second clocking means provided in said audio or video units, said first clocking means and second clocking means capable of being synchronized with each other, said controlling method comprising the steps of:
   synchronizing said clocking means;
   sending a pause command to one of said audio or video units;
   resetting position indicating means provided in that audio or video unit;
   sending a pause releasing command for releasing said pause command to that audio or video unit at time T1 of said synchronized clocking means;
   receiving position value x expressed in time units of said position indicating means and time Tx corresponding to said value x from said second clocking means; and
   computing delay time D after an initial time T1 until said pause operation releases by using formula $$(Tx - T1 - x).$$

4. A controlling method for a controlling system having a controller, a plurality of audio or video units, first clocking means provided in said controller, and second clocking means provided in said audio or video units, said first clocking means and second clocking means capable of being synchronized with each other, said controlling method comprising the steps of:

synchronizing said clocking means;

sending a command for asking about the position of a recording medium to one of said audio or video units;

receiving position value Pc expressed in time units of said position indicating means of said recording medium and time Tc of said second clocking means corresponding to said value Pc from that audio or video unit; and computing present tape position Pn by using formula $$(Pc + (Tn - Tc))$$

where Tn is present time of said synchronized clocking means.

5. A controlling system according to claim 1, wherein said controller is a computer and said audio or video units are video tape recorders.

6. A controlling method according to claim 2, wherein said controller is a computer and said audio or video units are video tape recorders.

7. A controlling method according to claim 3, wherein one of said audio or video units is a video tape recorder in a recording mode.

* * * * *